No. 836,864. PATENTED NOV. 27, 1906.
A. D. COLE.
ADJUSTABLE AND COLLAPSIBLE FIRE HOSE NOZZLE SUPPORTING DEVICE.
APPLICATION FILED APR. 4, 1906.
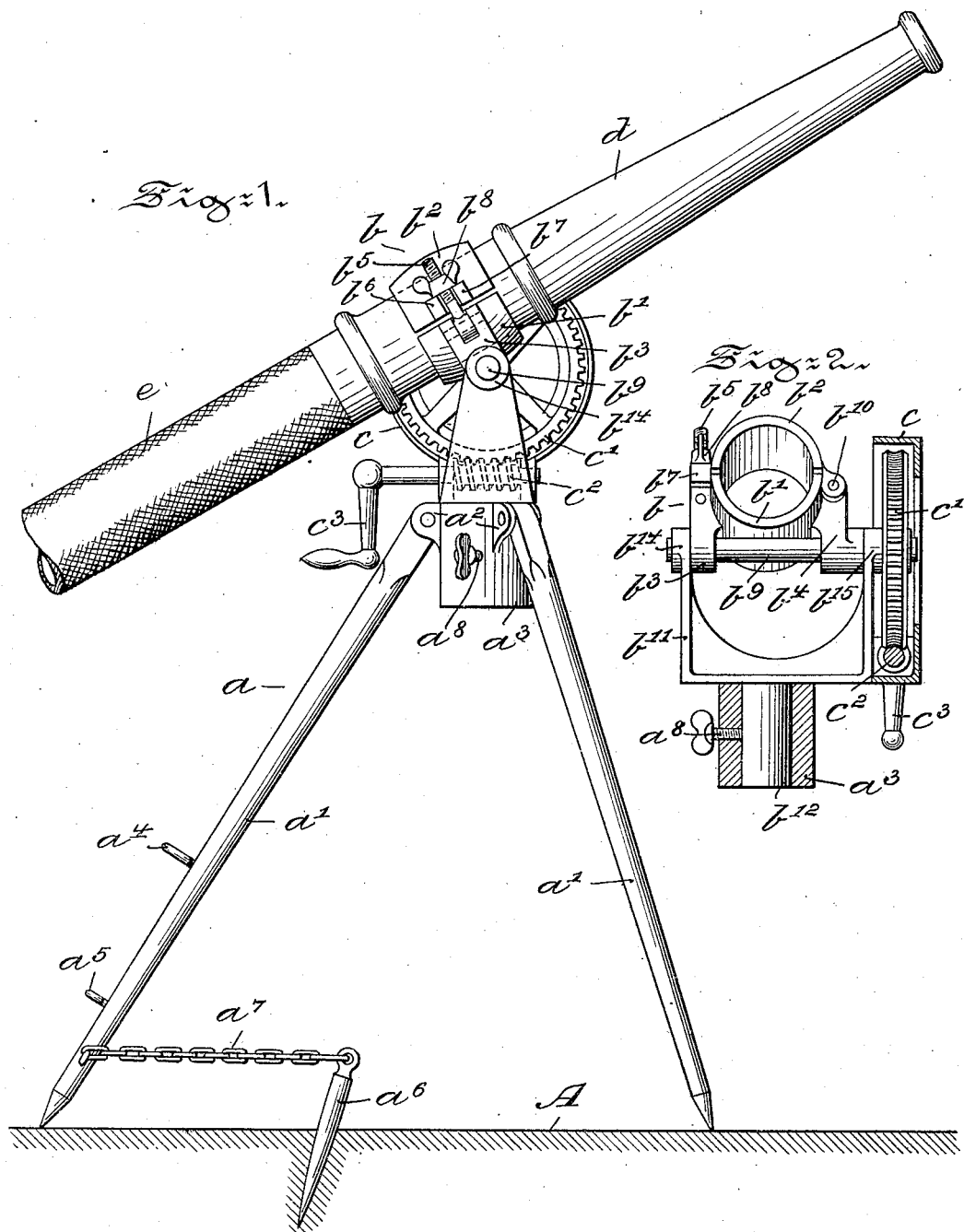

UNITED STATES PATENT OFFICE.

ANSON D. COLE, OF CAMDEN, NEW JERSEY.

ADJUSTABLE AND COLLAPSIBLE FIRE-HOSE-NOZZLE-SUPPORTING DEVICE.

No. 836,864.     Specification of Letters Patent.     Patented Nov. 27, 1906.

Application filed April 4, 1906. Serial No. 309,750.

*To all whom it may concern:*

Be it known that I, ANSON D. COLE, a citizen of the United States, residing at Camden, in the county of Camden and State of New Jersey, have invented certain new and useful Improvements in Adjustable and Collapsible Fire-Hose-Nozzle-Supporting Devices, of which the following is a specification.

My invention relates to an adjustable and collapsible fire-hose-nozzle-supporting device whereby the hose-nozzle may be readily shifted into different positions with respect to the supporting device therefor in an anchored position thereof, and in such connection my said invention relates more particularly to the constructive detail arrangement thereof for said purposes.

The nature and characteristic features of my said invention will be more fully understood from the following description, taken in connection with the accompanying drawings, forming part hereof, in which—

Figure 1 is a side elevational view of the device of the invention shown in an operative position with a section of hose and the nozzle therefor engaged and held by the device in an angular position with respect to the standard for the same and with the device anchored in position against back pressure of a fluid stream passing through the hose and nozzle tending to shift the position of the same in use; and Fig. 2 is a front elevational view of the upper portion of the supporting device with the standard or tripod for the same removed and in section, the hollow stud or shank of the device removed from the standard or tripod.

Referring to the drawings, $a$ represents a standard, preferably arranged in the form of a tripod provided with a series of members or legs $a'$, journaled to the ears or projections $a^2$ of a tubular head $a^3$. One of the members or legs $a'$ is provided with eyes $a^4$ and $a^5$ for supporting when not in use an anchor $a^6$, connected, by means of a chain $a^7$, with one or more of the legs $a'$ of the standard. When the legs of the tripod or standard $a$ are spread apart so as to occupy an operative position at an acute angle to the head $a^3$ thereof, the anchor $a^6$ is driven into the ground so as to occupy a position somewhat similar to that shown in Fig. 1, when the lower ends of the members or legs $a'$ of the standard $a$ engage an asphaltum or other similar type of road-bed A of a thoroughfare to prevent any tendency to overturning of the tripod-support or standard $a$, by back pressure or kick of the fire-hose supported by the nozzle to the said device in passage of water therethrough under high pressure, as is the case in the use of such character of hose for fire or other similar purposes. When the support or standard $a$ rests upon a comparatively soft or yielding road-bed A, the leg $a$, carrying the anchor $a$, is placed, preferably, in front of the tripod-support and the anchor $a^6$ driven into the ground to prevent any tendency to raising or overturning of the tripod by the back pressure of water flowing through the fire-hose supported from the device, to be hereinafter more fully explained.

$b$ is a clamp composed of two sections, whereof one, $b'$, is provided with legs $b^3$ and $b^4$ and with a threaded bolt $b^5$, adapted to engage between the lugs $b^6$ and $b^7$ of the section $b^2$, which latter is pivoted to the section $b'$ at the point $b^{10}$. A thumb-nut $b^8$ serves to lock the bolt $b^5$ to the lugs of the section $b^2$, as clearly shown in Fig. 1. The legs of the sectional clamp $b$ are rigidly secured to a shaft $b^9$. This shaft $b^9$ is journaled in a skeleton frame $b^{11}$, which is extended vertically on one side, forming a housing $c$ for a worm-wheel $c'$, rigidly mounted on the said shaft $b^9$. This worm-wheel $c'$ meshes with a worm-shaft $c^2$, journaled in the housing $c$ and operated by a hand-crank $c^3$ from one end thereof. The skeleton frame $b^{11}$ is provided with a stud or shank $b^{12}$ for engaging the head $a^3$ of the standard $a$ and with bearings $b^{14}$ and $b^{15}$, adapted to support the shaft $b^9$ of the clamp $b$. A set-screw $a^8$, arranged in the head $a^3$, permits of the clamping of the stud or shank $b^{12}$ in the head $a^3$ of the standard $a$. Between the sections $b'$ and $b^2$ of the clamp $b$ is placed the nozzle $d$ of a fire-hose $e$, which is held therein by means of the bolt $b^5$ and thumb-nut $b^8$, which connect the respective sections of the clamp $b$ with each other on one side of the same.

By the loosening of the set-screw $a^8$ the frame $b^{11}$, supporting the clamp $b$ and the nozzle $d$ and hose $e$, connected therewith, may be readily turned on the head of the standard $a$ to the required position and locked in such position by means of the set-screw $a^8$. By the turning of the hand-crank $c^3$, and thus the actuation of the worm-shaft $c^2$ and worm-wheel $c'$, the shaft $b^9$ of the frame $b^{11}$ may be readily operated and the nozzle $d$ shifted into the required angular position with respect to the standard $a$ for directing the stream of water issuing from the nozzle $d$ to the point or place desired. It may be here remarked that the angular position of the nozzle $d$ will be maintained by the worm-shaft $c^2$ until shifted by means of the hand-crank $c^3$.

Having thus described the nature and objects of my invention, what I claim as new, and desire to secure by Letters Patent, is—

In a device of the character described, a standard having a head provided with legs, an anchor connected with one of the legs, a frame having a stud rotatably arranged in the head, means for clamping the stud to the head, a shaft rotatably arranged in the free ends of the frame, a clamp having extensions engaging the shaft, said clamp adapted to removably support the nozzle of a fire-hose, a worm-wheel carried by the shaft, a housing forming the extension of the frame and surrounding the worm-wheel and having a worm-shaft engaging the worm-wheel, said worm-shaft adapted when actuated to rotate the worm-gear and when released to prevent rotation of the same, said shaft and clamp.

In testimony whereof I have hereunto set my signature in the presence of two subscribing witnesses.

ANSON D. COLE.

Witnesses:
J. WALTER DOUGLASS,
THOMAS M. SMITH.